United States Patent [19]

Béraudier et al.

[11] Patent Number: 5,609,450
[45] Date of Patent: Mar. 11, 1997

[54] METHOD AND APPARATUS FOR BROACHING OPENING IN A PLATE

[75] Inventors: Daniel Béraudier, Dracy Le Fort; Jean-Yves Douhéret, D'Andenay, both of France

[73] Assignee: Framatome, Courbevoie, France

[21] Appl. No.: 330,626

[22] Filed: Oct. 28, 1994

[30]  Foreign Application Priority Data

Oct. 29, 1993 [FR] France .................................. 93 12917

[51] Int. Cl.$^6$ .................................................. B23D 41/00
[52] U.S. Cl. ........................ 409/244; 409/268; 409/272
[58] Field of Search ........................... 483/28, 20; 29/564; 409/244, 248, 251, 265, 264, 266, 267, 268, 269, 272

[56] References Cited

U.S. PATENT DOCUMENTS

| | | | |
|---|---|---|---|
| 1,507,288 | 5/1924 | Infiorati, Jr. ............................. | 409/248 |
| 4,212,573 | 7/1980 | Fields ...................................... | 409/251 |
| 5,167,603 | 12/1992 | Iwaniuk et al. .......................... | 483/28 |
| 5,184,985 | 2/1993 | Varinelli et al. ......................... | 483/28 |

FOREIGN PATENT DOCUMENTS

| | | |
|---|---|---|
| 001933 | 5/1979 | European Pat. Off. . |
| 532866 | 3/1921 | France . |

*Primary Examiner*—William R. Briggs
*Attorney, Agent, or Firm*—Pollock, Vande Sande & Priddy

[57]  ABSTRACT

The plant comprises two broaching lines with successive actions, each comprising a traction device and an accompanying device which have axes of travel that are aligned along a common work axis. The work axes of the two broaching lines are separated by a distance at least equal to the diameter of the plate. The two traction devices and the two accompanying devices are arranged on the same side of the plate to be broached. The plate is moved on its support between a first broaching position in a first broaching line and a second broaching position in the second broaching line. The broaching on the first broaching line and the return of the traction and accompanying devices and of the broach to an initial arrangement, on the second broaching line, are performed simultaneously.

11 Claims, 6 Drawing Sheets

METHOD AND APPARATUS FOR BROACHING OPENING IN A PLATE

FIELD OF THE INVENTION

The invention relates to a broaching plant and to process for producing passage openings, arranged in a regular array, in a plate of profiled shape. In particular, the invention can be employed for producing passage openings in a tube support plate of a steam generator of a pressurized-water nuclear reactor.

BACKGROUND OF THE INVENTION

Steam generators of pressurized-water nuclear reactors comprise a bundle of U-shaped bent tubes whose straight legs must be maintained in parallel arrangements along the whole height of the bundle.

Each of the straight legs of each of the tubes of the bundle is fitted into a set of aligned openings of a set of tube support plates arranged in positions at a distance from one another along the height of the bundle. The openings passing through the tube support plates form regular arrays, for example with square or triangular meshes.

The passage openings must be shaped so that they simultaneously allow a tube to be supported effectively and for the steam generator feed water to flow around the tube, through the tube support plate.

The openings passing through the tube support plates may be of complex shapes, for example a trefoil shape.

The bundles of a high-power steam generator comprise a large number of tubes, for example of the order of 5,000, so that each of the tube support plates has a very large number of passage openings separated by metal sections which may be of relatively small thickness.

The passage openings in the tube plates must therefore be produced by a process which at the same time makes it possible to obtain very accurately shaped and sized openings, which is fast, and which can be easily carried out automatically.

The openings in the tube support plates are generally produced by broaching, i.e., by passing a profiled broach which has a cross-section corresponding to the section of the opening through each of the rough-drilled holes of an array of cylindrical rough-drilled holes passing through the plate.

The broaches which are moved in their axial direction through the rough-drilled holes comprise cutting ridges which make it possible to carry out the machining of the openings, generally as a single cut.

There are known broaching plants which comprise a support for holding and positioning the plate in a broaching position and means for moving the plate on its support in at least two directions parallel to the faces of the plate in working position, so as to place each of the rough-drilled holes successively on the axis of a broach secured to one of its ends in a traction device and at its other end in an accompanying device, the traction device and the accompanying device being situated on either side of the plate to be broached.

The traction device and the accompanying device comprise means for guiding and moving in a common axial direction perpendicular to the plate.

After each of the broaching operations performed by moving the traction and accompanying devices, the end of the broach must be separated from the accompanying device before the broach is completely released from the plate by a complementary movement of the traction device. The plate is moved away from the zone in which the traction device and the accompanying device move. The broach can then be refitted and secured in the accompanying device before being replaced in an initial broaching position.

The plate is then replaced in a new broaching position, generally by employing means for moving in at least two directions parallel to the faces of the plate.

To increase the performance speed of the broaching plant a number of broaches can be secured simultaneously to a unit consisting of a traction device and an accompanying device for carrying out the broaching of a number of openings simultaneously.

However, the production capacity of the broaching plants is limited by the fact that between two broaching operations it is necessary to separate the broach from the accompanying device, to take the broach out of the plate, to move the plate away, to replace the traction device and the accompanying device in their initial position and to move the plate towards a new broaching position.

This means that the effective plate broaching operations are separated by relatively long time intervals at the expense of production capacity and of plant efficiency.

In particular, the movement of the traction and accompanying devices to restore them to an initial position requires a time which is of the same order as the time needed to carry out the broaching.

To increase the production capacity of the broaching plants it has been proposed, in FR-A-2,407,780, to employ two parallel broaching lines, each comprising a traction device and an accompanying device which simultaneously perform the broaching of two openings or of two sets of openings in the plate.

The traction and accompanying devices of the two lines are placed in inverse arrangements on either side of the plate, so that the two lines function in opposite directions, the broaching being performed simultaneously, on two sets of openings, from either side of the plate. At the end of a broaching operation the two broaches or the two sets of broaches are turned around and transferred from a traction device to an adjacent accompanying device.

A relatively complex handling device must therefore be employed for turning the broaches around and transferring them.

SUMMARY OF THE INVENTION

The objective of the invention is therefore to propose a plant for broaching passage openings in a plate by passing a profiled broach successively through each of the holes of an array of rough-drilled holes passing through the plate, comprising a support for holding the plate in a broaching position, means for moving the plate in at least two directions parallel to its faces and for positioning this plate, means of traction and accompanying means of at least one broach which are arranged on either side of the plate in working position, and forming at least two broaching units each aligned along an axis perpendicular to the faces of the plate to be broached, this plant making it possible to achieve a very good production capacity while being simple in structure and operation and ensuring a continuity of operation in the event that a broaching unit becomes defective while the plant is being employed.

To this end, the two broaching units form two broaching lines with successive action, each comprising a traction device and an accompanying device which have axes of travel aligned along a common work axis. The work axes of the two broaching lines are separated by a distance which is at least equal to the maximum dimension of the plate in a first direction of travel of the latter and the two traction devices of the broaching lines, and the two actuating devices, respectively are arranged on the same side of the plate to be broached and means for moving the plate on its support are provided to move the plate between a first position for broaching at least any one opening in the plate, in the first broaching line and a second position for broaching at least any one opening in the second broaching line.

BRIEF DESCRIPTION OF THE DRAWINGS

To make the invention properly understood, an embodiment of a broaching plant according to the invention will now be described by way of example with reference to the accompanying drawings.

DETAILED DESCRIPTION

Figure 1:
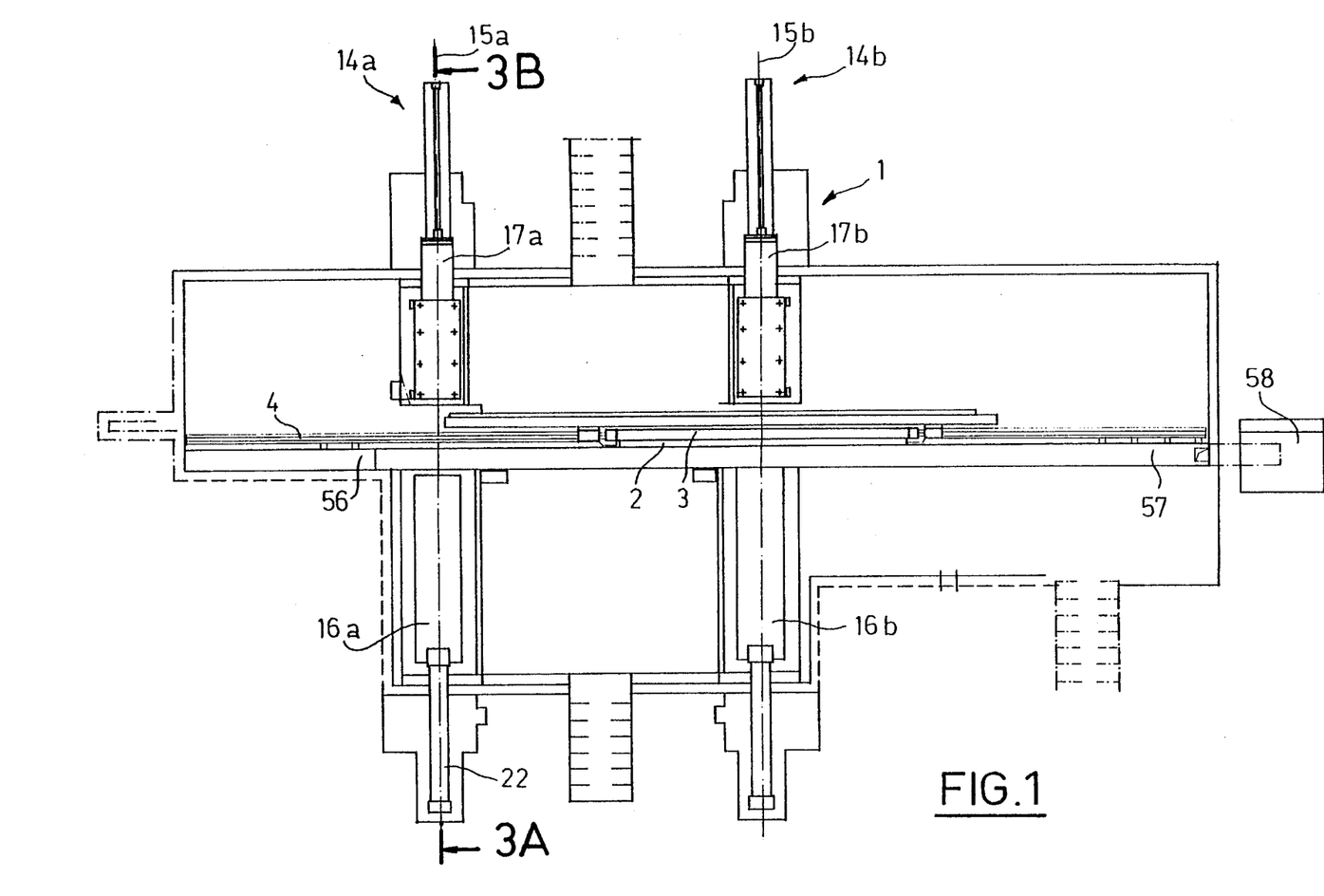
FIG. 1 is a top plan view of a broaching plant according to the invention.
Figure 2:
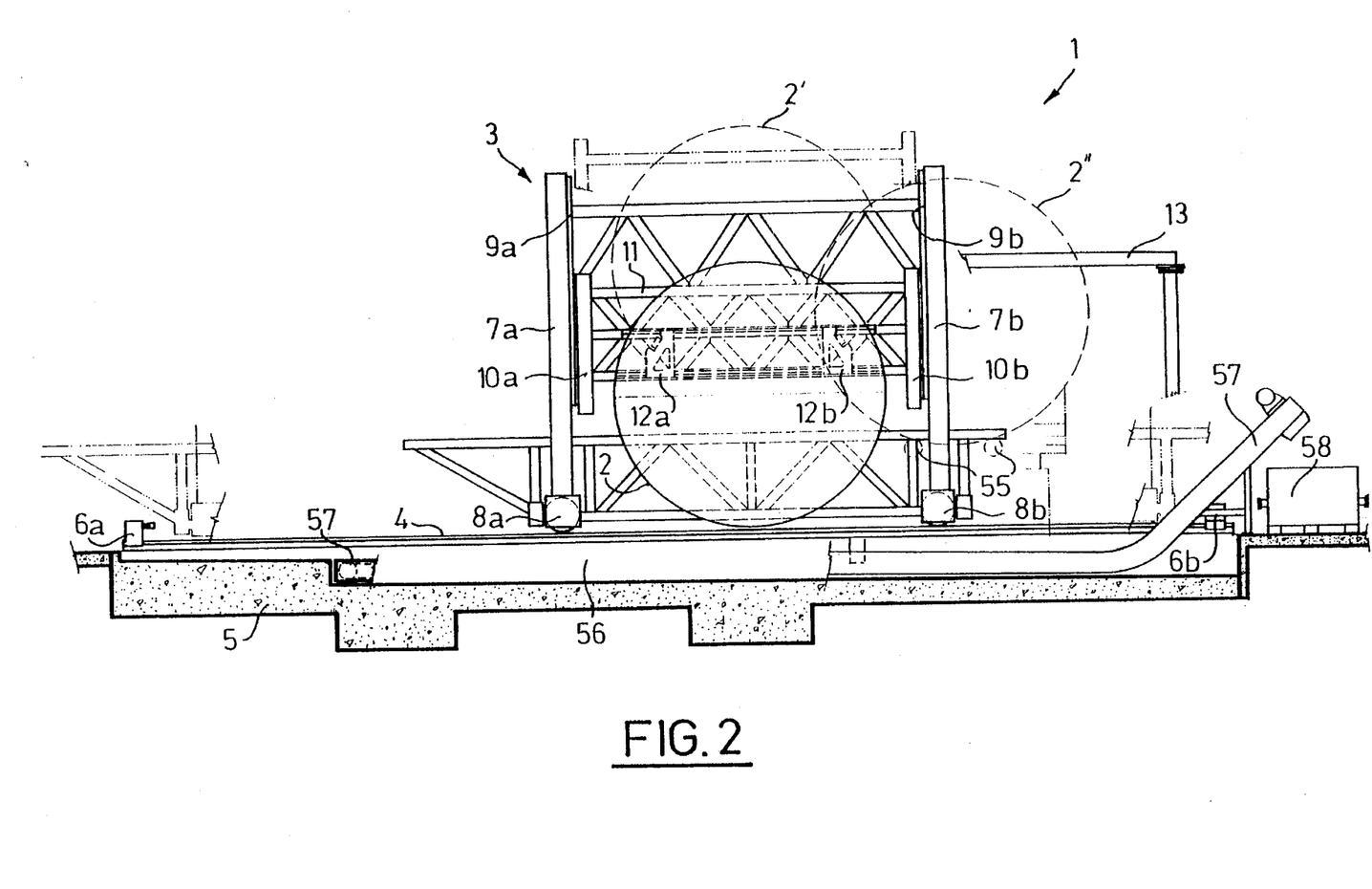
FIG. 2 is a front elevation view of the plant shown in FIG. 1.

FIGS. 1 and 2 show a broaching plant 1 according to the invention.

The broaching plant 1 makes it possible to carry out the broaching of tube support plates 2 of a steam generator of a pressurized-water nuclear reactor, of circular shape.

The plant 1 can be employed to perform the broaching of tube support plates which have a diameter between a minimum value and a maximum value, for example between a diameter of 2000 mm and a diameter of 4000 mm.

The plant 1 comprises a support 3 for the plate 2 in a vertical working position, mounted movably on a horizontal rail 4 secured to the floor 5 of the workshop in which the broaching plant is employed.

End stops 6a and 6b, arranged at the ends of the rail 4, enable the support 3 to be stopped in two outermost positions, when it moves along the rail 4.

The support 3 is made in the form of a rigid frame comprising vertical uprights 7a and 7b, connecting crosspieces between the uprights and stiffening components placed in oblique directions in relation to the uprights and to the crosspieces.

The uprights 7a and 7b are integrally attached in the lower sections to casings 8a and 8b in which rollers are rotatably filled. The rollers of the casings 8a and 8b rest on the rail 4 and provide the movement of the support 3 longitudinally of the rail 4.

The support 3 also bears, via an upper section fitted with bearing rollers, on a second rail carried by a gantry 13.

On the inner face, the uprights 7a and 7b comprise two vertical slides 9a and 9b between which a trolley 11 comprising lengthwise girders providing the connection between the skids 10a and 10b is fitted through the intermediary of skids 10a and 10b.

Supports 12a and 12b for securing the plate 2 are fitted on two lengthwise girders of the trolley 11.

The plate 2 is a planar circular steel plate through which an array of circular rough-drilled holes passes over its entire thickness.

The plate 2 is secured against the supports 12a and 12b by means of securing spindles, each fitting into a rough-drilled hole in the plate 2 and in an opening in the support.

In addition, the plate is held against the supports 12a and 12b in a vertical position, without any possibility of swinging forward in relation to the support 3, by means of cleats inserted into a rough-drilled hole and into a corresponding opening in a support 12a or 12b and comprising a head for bearing on the front face of the plate 2.

The trolley 11 allows the plate 2 to be moved between a low position 2 shown by continuous lines in FIG. 2 and a high position 2' shown in broken lines.

A lower crosspiece of the support 3 carries a rack which meshes with a pinion secured to the shaft of a reducing gear in a stationary position on the workshop floor 5.

The support 3 carrying the tube support plate 2 can thus be moved longitudinally of the rail 4 by means of the trolley 11.

The plate 2 can be moved by means of the supports 3 and 11 in two directions parallel to its faces, one horizontal, the other vertical, to provide the successive positioning of the rough-drilled holes in the plate, in the alignment of the broaching lines, as will be explained hereinbelow.

As can be seen in FIG. 1, the plant 1 comprises two broaching lines 14a and 14b providing the movement of a group of broaches along a broaching axis 15a or 15b perpendicular to the plane of the faces of the plate 2 in working position on the support 3.

The broaching axes 15a and 15b of the two broaching lines 14a and 14b are separated from one another by a distance which is greater than the diameter of the tube support plates of maximum diameter, the broaching of which can be performed on the plant 1.

In the case of the steam generator tube support plates, as indicated above, this distance is greater than four meters.

Each of the broaching lines comprises a traction device 16a (or 16b) and an accompanying device 17a (or 17b).

Figure 3A:
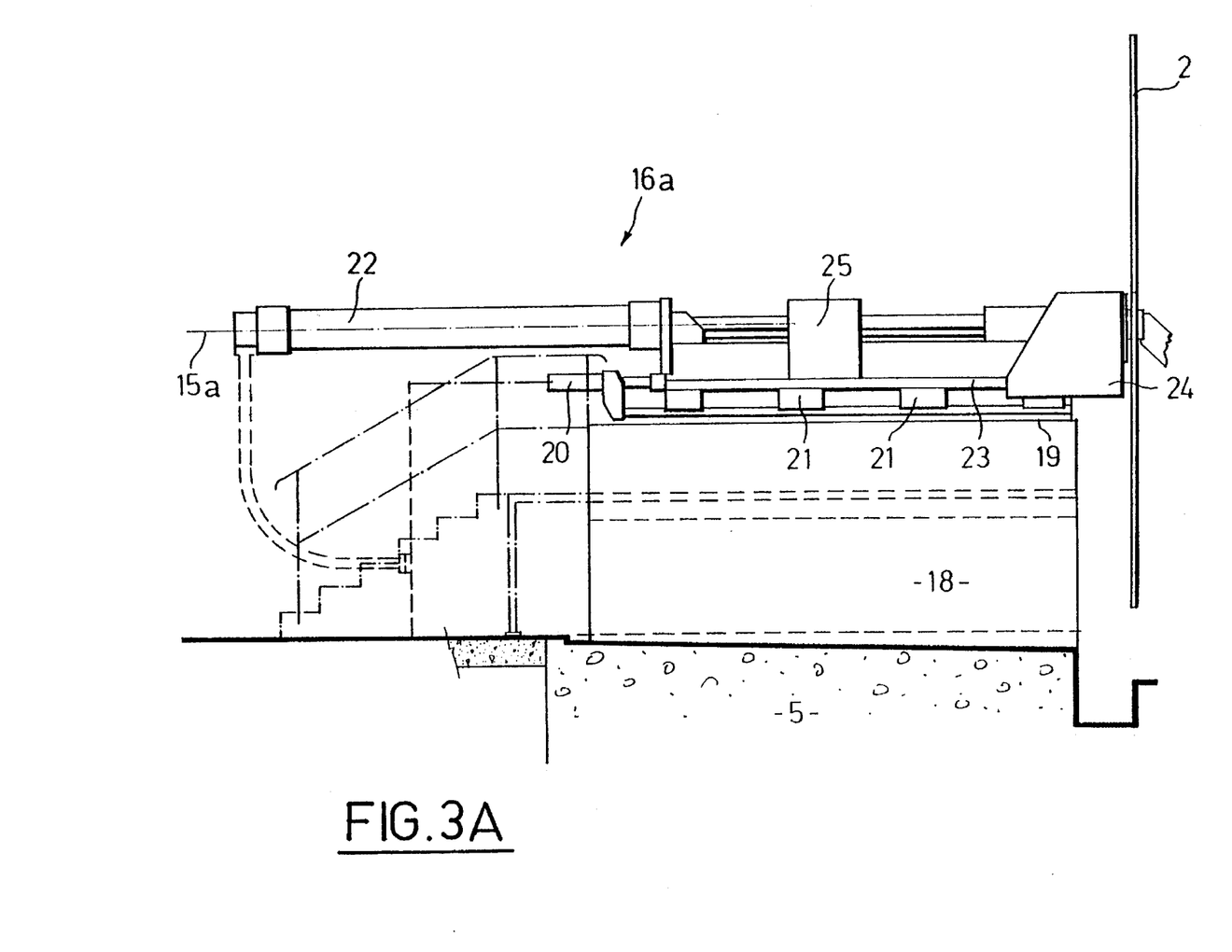
FIGS. 3A and 3B are views in section along line 3A–3B of FIG. 1, showing a traction device and an accompanying device, respectively.

As can be seen in FIG. 3A, a traction device 16a comprises a support 18 resting on the workshop floor 5, the upper surface of which carries horizontal slides 19 and a maneuvering jack or vice jack 20 carried by securing lugs.

A unit comprising a traction jack 22, a slide 23 parallel to the actuating axis of the jack 22 and a bearing block 24 is fitted on the slides 19 by means of sliding skids 21.

The rod of the jack 22 is integrally attached to a breaching head 25 fitted so as to move on the slides 23.

The Jack 22 enables the broaching head 25 to be moved on the slides 23 in the direction of the broaching axis 15a of the broaching line 14a.

The vice jack 20 enables the unit consisting of the jack 22, the slides 23 and the bearing block 24 to be moved between a retracted position, in which the bearing block 24 is not in contact with the plate to be broached 2 and a position in which it bears against the plate, shown in FIG. 3A.

The broaching head 25 comprises a set of sleeves enabling a set of broaches to be secured in directions parallel to the broaching axis 15*a*, by means of one of their ends, as will be explained with regard to FIG. 4.

The sleeves for securing the broaches to the broaching head 25 are fitted so as to make it possible to vary the distance separating the broaches between two outermost values.

The broaching head can thus be modified for carrying out the broaching of plates comprising arrays of rough-drilled holes at various separating distances.

Figure 3B:
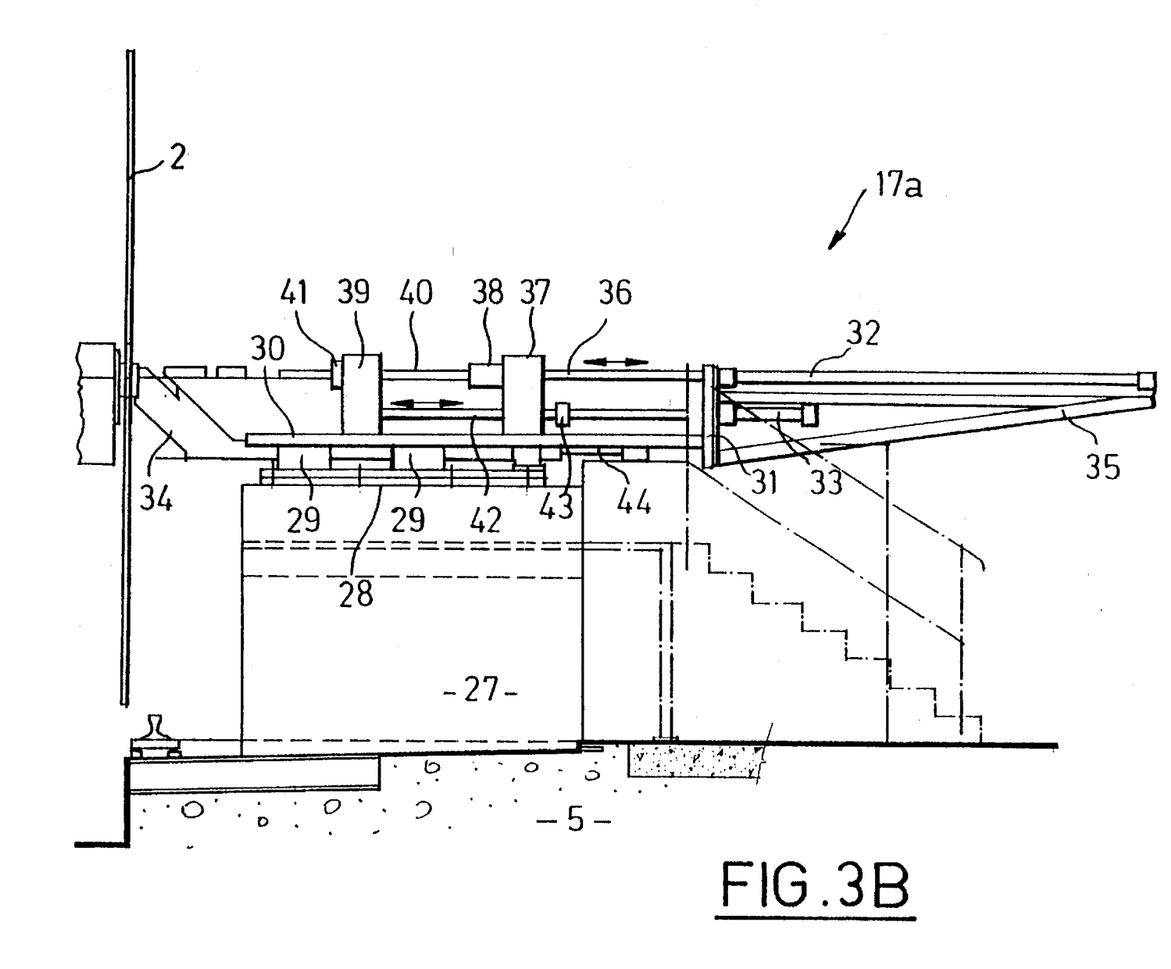

As can be seen in FIG. 3B, an accompanying device such as 17*a* comprises a support 27 resting on the workshop floor 5 and carrying slides 28 on its upper surface. A unit comprising a longitudinal slide 30 parallel to the slides 28, a support plate 31 integrally attached to the slide 30, an accompanying jack 32 and an engagement jack 33 which are carried by the plate 31, and a bearing block 34, is mounted on the slides 28 by means of the sliding skids 29.

The jacks 32 and 33 are supported by the plate 31 by means of a reinforcing structure 35.

The rod 36 of the jack 32 is integrally attached to an accompanying head 37 to which a group of broaches 40 can be secured by means of clamps 38.

The accompanying head 37 is fitted movably on the slide 30.

Also fitted movably on the slide 30 is an engagement trolley 39 comprising clamps 41 capable of ensuring the clamping and the driving of the broaches 40.

The rod 42 of the engagement jack 33 slides through the accompanying head 37 to be secured by its end portion to the engagement trolley 39.

An end stop 43 is secured to the rod 42 at the rear of the accompanying head 37.

A jack 44, called a vice jack, secured to a portion of the support 27, comprises a rod integrally attached to the slide 30, itself integrally attached to the plate 31, jacks 32 and 33, and to the bearing block 34, which form a unit fitted movably on the slides 28.

The vice jack 44 allows the unit to be moved between a retracted position and a position for bearing on the plate 2, as shown in FIG. 3B.

Figure 4:
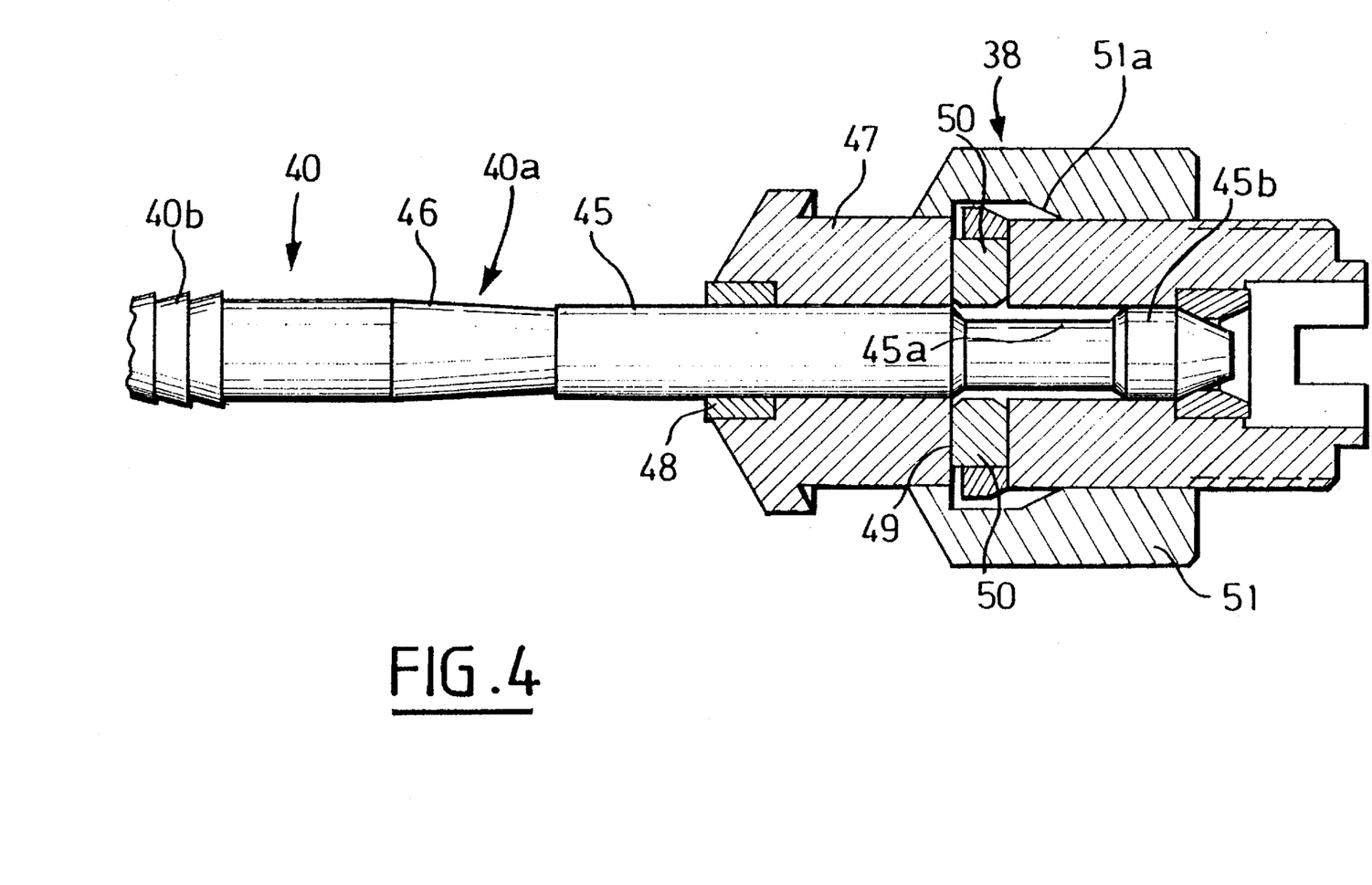
FIG. 4 is a sectional view of a clamp for attaching the end of a broach into the head of the traction or accompanying device.

As can be seen in FIG. 4, the broaches 40 comprise an end part 40*a* enabling them to be introduced and secured inside a sleeve-clamp such as a clamp 38 of a traction or accompanying device. The end part 40*a* of the broach 40, in the axial extension of the machining part 40*b* of the broach, which has cutting ridges, comprises a part of smaller diameter 45 and a transition part 46 between the part of smaller diameter 45 and the machining part 40*b* of the broach.

The end part of reduced diameter 45 comprises an attaching groove 45*a* and, following this attaching part, at its end, a guiding olive 45*b* of frustoconical shape.

The attaching device with clamps 38 comprises a sleeve 47 of tubular shape, to one end of which is secured a guiding bush 48 whose internal diameter is substantially equal to the diameter of the part 45 of the broach, on either side of the groove 45*a* and of the radial openings 49, in which locking components 50 are placed.

When the broach 40 is engaged entirely with its part 45 inside the sleeve 47 of the clamp 38, the groove 45*a* faces openings 49 and the locking components 50.

An actuating plunger 51 is engaged onto the body 47 of the clamp 38 and comprises an internal groove 51*a* comprising frustoconical actuating end parts which comes into contact with corresponding actuating parts of the locking jaws 50, when the plunger 51 moves axially of the sleeve 47.

Thus, after engagement of the part 45 of the broach inside the sleeve 47, the broach can be locked inside the sleeve by axial movement of the plunger 51 which is held in the locking position of the jaws 50.

The movement of the plunger 51 in the locking or unlocking direction of the jaws 50 is carried out completely automatically during the operating cycle of the broaching plant, as will be described hereinbelow.

The operation of the broaching plant will now be described, with reference to FIGS. 5A, 5B and 5C and 6A, 6B and 6C, during a complete cycle for broaching on one of the broaching lines and for restoring the broaches in position for a new cycle on the second broaching line.

Figure 5A:
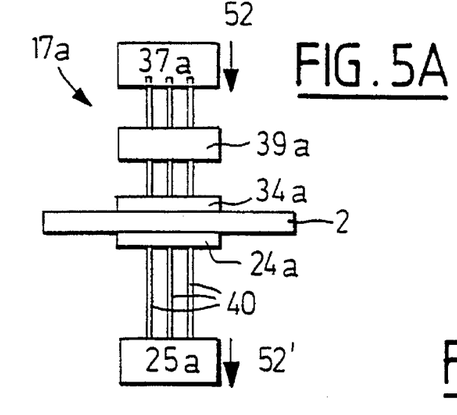
FIGS. 5A, 5B and 5C are schematic views showing successive functional stages of a broaching operation on one of the broaching lines of a plant according to the invention.
Figure 5B:
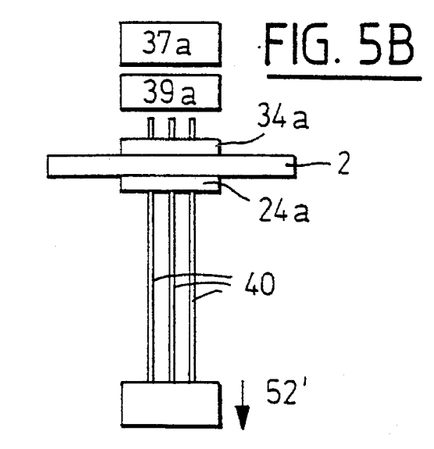
Figure 5C:
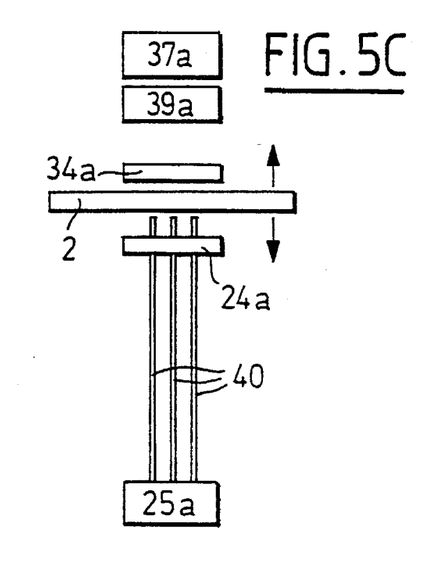

FIGS. 5A, 5B and 5C show the first broaching line 14*a* including the traction device 16*a* and the accompanying device 17*a*. The accompanying device 17*a* itself comprises the accompanying head 37*a*, the engagement trolley 39*a* and the bearing block 34*a* integrally attached to a unit comprising the slides for guiding the head 37*a* and the trolley 39*a*.

The traction device 16*a* comprises the traction head 25*a* and the bearing block 24*a* integrally attached to a unit comprising the slides for guiding the head 25*a*.

Figure 6A:
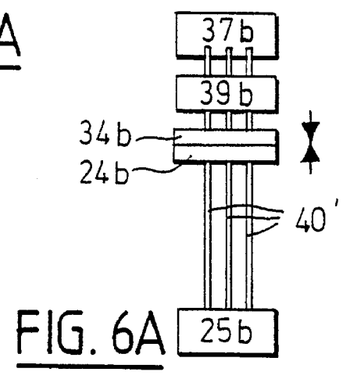
FIGS. 6A, 6B and 6C are schematic views showing successive stages of an operation for restoring the broaches on the second line of the plant into an initial position, simultaneously with the broaching.
Figure 6B:
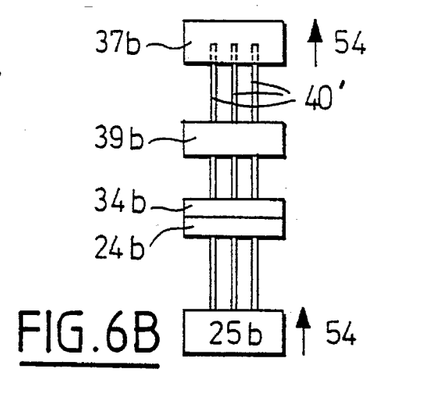
Figure 6C:
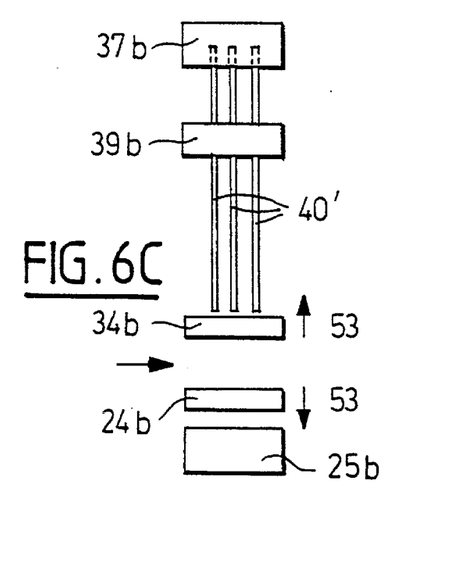

As can be seen in FIGS. 6A, 6B and 6C, the broaching line 14*b* on which the accompanying devices 17*b* and 16*b* are situated comprises components 37*b*, 39*b*, 34*b*, 25*b* and 24*b* which are similar to the components 37*a*, 39*a*, 34*a*, 25*a* and 24*a* of the broaching line 14*a*.

The broaching line 14*a* comprises broaches 40 which can be moved to carry out the broaching by the traction device 16*a* and the accompanying device 17*a*, the heads of which move simultaneously on the guiding slides.

The broaching line 14*b* comprises broaches 40' which can be restored to an initial position by the devices 16*b* and 17*b*, simultaneously with the broaching on the line 14*a*.

Three broaches 40 (or 40') have been shown on each of the broaching lines, the broaches 40 or 40' being capable of being secured by means of sleeves such as described with regard to FIG. 4, to each of the traction and accompanying devices. The sleeves themselves are fitted so that the interaxial distances between the broaches 40 or 40' can be adjusted to the value of the pitch of the array of the holes of a plate 2 to be broached.

FIGS. 5A, 5B and 5C, corresponding to the broaching line 14*a* , show the plate 2 in a broaching position, this broaching being performed by passing the broaches 40 inside the rough-drilled holes of the plate 2 in the direction shown by the arrows 52 and 52' representing the movement of the heads 25*a* and 37*a*.

The broaches are secured by locking sleeves, as described above, at one of their ends in the traction head 25*a* and at their other end in the accompanying head 37*a*. The clamps of the accompanying trolley 39*a* are in unclamped position, with the result that the broaches move by sliding inside the trolley 39*a* which is responsible only for holding and guiding them. The bearing blocks 24*a* and 34*a* are held by the vice jacks against the opposite faces of the plate 2.

During the operation of complete broaching of the plate 2, shown schematically in FIGS. 5A, 5B and 5C, restoration of the broaches 40' to an initial position after a broaching operation, shown schematically in FIGS. 6A, 6B and 6C, is carried out on the second broaching line 14*b*.

At the end of a broaching operation, as can be seen in FIG. 5B corresponding to the broaching line 14a, the clamps for securing the broaches 40 to the accompanying head 37a are unlocked. The accompanying head 37a is stopped in a waiting position and the traction head 25a and the broaches 40 continue to be moved as far as a position where the broaches 40 are engaged only in the bearing block 34a of the accompanying side.

The traction head 25a is then stopped and the bearing blocks 24a and 34a are separated by maneuvering the vice jacks 20 and 44, as can be seen in FIG. 5C.

The broaches 40 are then held by the traction head 25a and the bearing block 24a.

Plate 2 is then released and can be transferred by devices for moving in the transverse direction, into the second broaching line.

The operations which are necessary for restoring into their initial position the components of a broaching line, after a broaching operation and after the transfer of the plate to be broached towards the second broaching line, now be described with reference to FIGS. 6A, 6B and 6C, corresponding to the second broaching line 14b.

FIG. 6A shows the components of the broaching line 14b in a stage subsequent to the transfer of the plate, during which the movement of the bearing blocks 24b and 34b by the vice Jacks is carried out in order to place them in contact with one another.

Before this movement of the bearing blocks, the accompanying head 37b is prepositioned so that the broaches 40' are engaged in the sleeves of the accompanying head during the movement of the bearing blocks and of the set of the accompanying and traction devices in the direction bringing them closer together.

With the free end of the broaches 45 inside the sleeves of the locking devices 38 of the accompanying head 37b, the locking devices 38 are brought into action so as to provide the connection between the end of the broaches 40' and the accompanying head 37b. As can be seen in FIG. 6B, the accompanying head 37b, the broaches 40' and the traction head 25b are moved in the direction of the arrow 54 to ensure the return of the broaches 40' to their initial position. The ends of the broaches 40' engaged in the traction head 25b, which remains in a waiting position, are then unlocked. The bearing blocks 24b and 34b remain clamped against one another.

The movement of the accompanying head 37b in the direction of the arrow 54 allows the broaches 40' to be replaced in a position released from the blocks 24b and 34b, which is shown in FIG. 6C; in this position released from the blocks 24b and 34b the broaches 40' remain engaged in the trolley 39b and comprise a free end part in front of the trolley 39b, situated at a certain distance from the traction head 25b in its waiting position.

The blocks 24b and 34b can then be separated from one another (arrows 53) to obtain a free space making it possible to receive the plate 2 brought in laterally.

The plate 2, which has been released from the bearing blocks of the broaching line 14a and from the broaches 40, can be moved (arrow 59) to come into a working position in the line 14b, between the bearing blocks 24b and 34b.

The blocks 24b and 34b are then replaced bearing against the faces of the plate 2.

An operation for engaging the broaches in the plate 2 and in a traction head 25 will now be described with reference to FIGS. 3A and 3B. This operation is carried out after the plate has been placed in a working position and after tightening of the bearing blocks 24 and 34.

The tightening of the clamps of the engagement trolley 39 and the releasing of the locking devices 38 of the accompanying head 37 is carried out.

The engagement trolley 39 is moved in the direction of the plate 2 and the accompanying head 37 is driven in the same direction by means of the end stop 43.

The broaches 40 are thus brought in a completely guided manner opposite the openings which are to be broached in the plate 2.

The broaches 40 moved by the engagement trolley 39 are introduced into the rough-drilled holes in the plate 2 by an engagement part 45 like that shown in FIG. 4.

The engagement parts 45 of the broaches 40' are next introduced into the locking sleeves of the traction head 25.

Tightening of the devices for locking the engagement head 37 and the traction head 25 is carried out.

The broaching can then be performed, as described above with regard to the broaching line 14a (FIGS. 5A, 5B and 5C) after releasing of the clamps of the engagement trolley 39.

During the broaching the engagement trolley 39 remains in place, the holding of the end of the broaches 40 being ensured by the accompanying head 37.

Simultaneously with the broaching on the line 14b, restoring of the components of the broaching line 14a and in particular the broaches 40 into an initial position is performed, as was described above with regard to the broaching line 14b.

The operations for restoring the broaches into initial position on a line are performed during a broaching operation on the second broaching line, i.e., without affecting the critical path.

The production rate and the efficiency of the broaching plant are thus increased. This result is obtained without having to carry out complex handling of the broaches on the broaching lines.

The means for moving the plate 2 to be broached in the horizontal direction and in the vertical direction, like those shown in FIGS. 1 and 2, enable this plate to be placed successively at each broaching line and thus as to carry out by successive cuts the broaching of all the rough-drilled holes passing through the plate.

In fact, the position in height of the traction and accompanying devices makes it possible to carry out successively the broaching of all the rough-drilled holes passing through the lower half-plate, i.e., the lower part of the plate bounded by its diameter in horizontal direction.

When the rough-drilled holes of the half-plate have been broached, the plate 2 is secured to a hoist or a lifting hook of a travelling crane, for transport to a position 2" where the plate is rested on rollers 55 with horizontal axes of a turning gear.

The turning gear allows the plate to be turned round so that, after the plate has been replaced on its support 3, the holes in the second half-plate are broached by successive cuts on both broaching lines 14a and 14b.

During broaching the plate is placed in well-defined and preprogrammed positions by horizontal and vertical moving means 8a, 8b; 9a, 9b ; 10a, 10b.

In its extreme left and right positions, the support 3 is stopped by the end stops 6a and 6b.

All the movements of the plate and of the traction and accompanying devices and the maneuvering of the clamping and locking members of these devices are carried out in an automatic and preprogrammed manner.

Errors and dead times are thus avoided while the broaching plant is in use.

In addition, the fact of having two broaching lines working independently enables the broaching operation to be continued even if one broaching line becomes unavailable as a result of a breakdown in one of the components.

The passage of the broaches through the plate 2 produces swarf which is driven to the traction device side.

This swarf is recovered inside a drainage channel 56 arranged horizontally on the workshop floor 5, by a continuous conveyor 57 whose delivery part is placed above a swarf recovery tank 58.

The means for moving the plate in two directions parallel to its faces can be constructed in a form which differs from that described.

Similarly, the traction and accompanying devices may have a structure and shape differing from those described.

Finally, the plant according to the invention and the corresponding broaching process can be employed for the broaching of plates other than steam generator tube support plates.

We claim:

1. A plant for broaching passage openings in a plate by passing a profiled broach successively through each hole of an array of rough-drilled holes passing through the plate, said plant comprising
   (a) a support for holding said plate in a broaching position;
   (b) at least two broaching units forming two broaching lines with successive action, each of said units comprising a traction device and an accompanying device arranged on either side of said plate in working position on said support and having axes of travel aligned along a common work axis of a broaching line perpendicular to faces of said plate, the work axes of the two broaching lines being separated by a distance which is at least equal to a maximum dimension of said plate in a first direction of travel of said plate, and the two traction devices and the two accompanying devices being respectively arranged on a first and a second side of said plate; and
   (c) means for moving said plate in at least said first direction of travel and a second direction of travel parallel to said faces of said plate.

2. The plant according to claim 2, wherein said plate to be broached is a plate of circular shape arranged in a vertical position on a support fitted movably through an intermediary of means for rolling on a horizontal rail and comprising vertical columns to which are secured slides for guiding a trolley to which said plate is secured.

3. The plant according to claim 3, wherein said plate to be broached is secured to said trolley by means of securing shafts and retaining cleats fitting into coinciding openings consisting of said rough-drilled holes in said plate and openings in said trolley.

4. The plant according to claim 12, wherein each of the traction devices comprises a unit fitted movably on a first slide secured to a support in the direction of the axis of a broaching line and comprising a traction jack and a second slide in axial direction as well as a block for bearing on one face of said plate to be broached, a rod of said traction jack being integrally attached to a traction head fitted movably on said second slide and comprising means for locking the end of a broach.

5. The plant according to claim 4, wherein each of the traction devices additionally comprises a vice jack carried by the stationary support and comprising a rod connected to the movable unit consisting of said traction jack, said second slide and said bearing block, for moving said bearing block between a position in which it bears, by means of said bearing head, against said plate to be broached and a retracted position in which said bearing head is not in contact with said plate to be broached.

6. The plant according to claim 1, wherein each of the accompanying devices comprises a first slide secured to a support in the direction of the axis of a broaching line and a unit fitted movably on said first slide, consisting of a block for bearing on a face of said plate to be broached, of an accompanying jack, of a second slide and of a means for moving, in the axial direction, an engagement trolley movable on said second slide, a rod of said accompanying jack being integrally attached to an accompanying head fitted movably on said second slide and equipped with clamps for securing one end of a broach in the alignment of tightening clamps integrally attached to said engagement trolley, said engagement trolley comprising means for driving said accompanying head by traction.

7. The plant according to claim 1, further comprising automatic means for controlling said means for moving said plate, traction devices and accompanying devices of each of the two broaching lines for simultaneously broaching at least one opening in said plate by moving a broach on one of said broaching lines and returning said traction and accompanying devices and said broach towards an initial position for broaching on said second broaching line.

8. A process for broaching passage openings in a plate by passing a profiled broach successively through each hole of an array of rough-drilled holes passing through said plate, said process being carried out by means of a plant comprising
   (a) a support for holding said plate in a broaching position;
   (b) at least two broaching units forming two broaching lines with successive action, each of said units comprising a traction device and an accompanying device arranged on either side of said plate in working position on said support and having axes of travel aligned along a common work axis of a broaching line perpendicular to said faces of said plate, the work axes of the two broaching lines being separated by a distance which is at least equal to a maximum dimension of said plate in a first direction of travel of said plate, and the two traction devices and the two accompanying devices being respectively arranged on a first and a second side of said plate; and
   (c) means for moving said plate in at least said first direction of travel and a second direction of travel parallel to said faces of said plate;
   (d) wherein said traction device, said accompanying device and the broach of a second broaching line are returned into an initial arrangement allowing broaching to begin on a second broaching line of said broaching lines during a broaching operation on a first broaching line of said two broaching lines.

9. The process according to claim 8, comprising the steps of
   (a) performing the broaching operation on said first broaching line by passing at least one broach connected at one end of said broach to a movable head of a traction device and at the other end of said broach to a movable accompanying head of said accompanying device, through at least one opening in said plate;

(b) releasing said broach from its connection to said accompanying head of said accompanying device towards the end of the broaching operation by passing said broach through the passage opening in said plate; and (c) moving apart from one another movable units of said traction device and of said accompanying device to obtain complete separation of said broach from said plate and release of said plate.

10. The process according to claim 8, comprising the steps of (a) returning the accompanying device and the broach of a second broaching line during the broaching on the first broaching line by successively moving movable units of said traction device and of said accompanying device of said second broaching line in an axial direction towards one another to obtain engagement of the end of said broach at the opposite end with respect to said traction device, in a receiving part of a movable accompanying head of said accompanying device;

(b) locking the end of said broach in said accompanying head;

(c) moving said broach and said traction and accompanying heads in an opposite broaching direction; and (d) separating said broach from said traction head by moving said accompanying head in the axial direction driving said broach in a direction opposite to said traction head.

11. The process according to claim 8, comprising the steps of (a) moving said plate to be broached at the end of a broaching operation on said first broaching line and returning the members of said second broaching line into an initial position for broaching on said second broaching line;

(b) tightening clamps of an engagement trolley on said broach of said second broaching line;

(c) moving said engagement trolley in the direction of said plate to be broached and, through its intermediary, said accompanying head of said accompanying device;

(d) engaging said broach in a rough-drilled hole of said plate to be broached and then into a receiving opening of said traction head of said traction device; and (e) locking one end of said broach in said receiving opening of said traction head and the other end of said broach in a receiving opening of said accompanying head.

* * * * *

UNITED STATES PATENT AND TRADEMARK OFFICE
CERTIFICATE OF CORRECTION

PATENT NO. : 5,609,450
DATED : March 11, 1997
INVENTOR(S) : BERAUDIER et al.

It is certified that error appears in the above-indentified patent and that said Letters Patent is hereby corrected as shown below:

Column 9, line 59, claim 4, change "12" to --1--.

Signed and Sealed this

Twenty-fifth Day of November, 1997

Attest:

BRUCE LEHMAN

*Attesting Officer*  *Commissioner of Patents and Trademarks*